(12) United States Patent
Braun et al.

(10) Patent No.: US 11,280,196 B2
(45) Date of Patent: Mar. 22, 2022

(54) SYSTEMS AND METHODS FOR GENERATING POWER USING A COMBUSTION SOURCE

(71) Applicant: BOARD OF REGENTS, THE UNIVERSITY OF TEXAS SYSTEM, Austin, TX (US)

(72) Inventors: Eric M. Braun, Huntsville, AL (US); Frank K. Lu, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 867 days.

(21) Appl. No.: 15/126,823

(22) PCT Filed: Mar. 20, 2015

(86) PCT No.: PCT/US2015/021815
§ 371 (c)(1),
(2) Date: Sep. 16, 2016

(87) PCT Pub. No.: WO2015/143362
PCT Pub. Date: Sep. 24, 2015

(65) Prior Publication Data
US 2017/0093253 A1   Mar. 30, 2017

Related U.S. Application Data

(60) Provisional application No. 61/968,234, filed on Mar. 20, 2014.

(51) Int. Cl.
*F02C 5/02* (2006.01)
*F23C 15/00* (2006.01)
(Continued)

(52) U.S. Cl.
CPC ............. *F01B 11/007* (2013.01); *F02C 5/02* (2013.01); *F02C 5/12* (2013.01); *F23C 15/00* (2013.01);
(Continued)

(58) Field of Classification Search
CPC .... F23C 15/00; F23R 7/00; F02K 7/02; F02K 7/06; F02C 5/12; F05D 2260/16; F01B 11/007
See application file for complete search history.

(56) References Cited

U.S. PATENT DOCUMENTS 1,805,093 A * 5/1931 Holzwarth ................ F02C 5/12
                                                           415/175
2,543,758 A * 3/1951 Bodine, Jr. ............... F02K 7/02
                                                            60/247
(Continued)

OTHER PUBLICATIONS

Braun, et al., "Modelling of a detonation driven, linear electric generator facility", Aerodynamics Research Center, 2012.
(Continued)

*Primary Examiner* — Ted Kim
(74) *Attorney, Agent, or Firm* — Thomas | Horstemeyer, LLP (57) ABSTRACT

In one embodiment, a power generation system includes a pulse detonation engine including a combustion chamber, a linear power generator including a working chamber, and a nozzle positioned between the combustion chamber and the working chamber that expands exhaust gas expelled from the combustion chamber, wherein the nozzle increases thermodynamic efficiency of the system.

10 Claims, 6 Drawing Sheets

(51) Int. Cl.
   *F01B 11/00* (2006.01)
   *F02C 5/12* (2006.01)
   *F23R 7/00* (2006.01)

(52) U.S. Cl.
   CPC ............ *F23R 7/00* (2013.01); *F05D 2220/76* (2013.01); *F05D 2260/16* (2013.01)

(56) References Cited

U.S. PATENT DOCUMENTS

| | | | | |
|---|---|---|---|---|
| 2,872,780 | A * | 2/1959 | Schmidt | F02K 7/06 60/248 |
| 3,175,357 | A * | 3/1965 | Klein | F02C 5/10 60/249 |
| 3,266,252 | A * | 8/1966 | Hughes | F02K 7/06 60/39.77 |
| 3,954,380 | A * | 5/1976 | Valaev | F23C 15/00 431/1 |
| 4,759,318 | A * | 7/1988 | Adams | B25C 1/08 123/46 SC |
| 5,426,940 | A * | 6/1995 | Tomoiu | F02B 71/04 60/39.55 |
| 6,062,018 | A * | 5/2000 | Bussing | B01J 3/08 60/39.181 |
| 6,062,108 | A | 5/2000 | Rosero | |
| 6,213,097 | B1 * | 4/2001 | Maucher | F01B 11/007 60/595 |
| 6,759,755 | B2 | 7/2004 | Sagov | |
| 6,920,761 | B2 * | 7/2005 | Laper | F02C 5/02 60/39.27 |
| 6,938,588 | B2 * | 9/2005 | Jacobsen | F01B 11/00 123/305 |
| 7,150,143 | B2 | 12/2006 | Schick | |
| 7,340,903 | B2 | 3/2008 | Lu | |
| 7,367,194 | B2 * | 5/2008 | Murayama | F02C 3/28 60/39.38 |
| 7,634,904 | B2 | 12/2009 | Rasheed | |
| 7,721,523 | B2 | 5/2010 | Tangirala | |
| 2009/0322102 | A1 | 12/2009 | Lu | |

OTHER PUBLICATIONS

Braun, et al., "Proof-of-Principle Detonation Driven, Linear Electric Generator Facility", 46th AIAA/ASME/SAE/ASEE Joint Propulsion Conference and Exhibit; Jul. 2010.
Zeldovic, Ya.B. "Journal of Technical Physics", 1940;10(17).

* cited by examiner

SYSTEMS AND METHODS FOR GENERATING POWER USING A COMBUSTION SOURCE

CROSS-REFERENCE TO RELATED APPLICATION

This application is the 35 U.S.C. § 371 national stage of, and claims priority to and the benefit of, PCT application PCT/US2015/021815, filed Mar. 20, 2015, which claims priority to and the benefit of U.S. Application No. 61/968,234, filed on Mar. 20, 2014, herein incorporated by reference in their entirety.

BACKGROUND

A pulse detonation engine (PDE) is a device that combusts a fuel and oxidizer mixture to generate detonation waves that can be used for propulsion. The engine is pulsed because the mixture must be renewed in the combustion chamber between each detonation wave initiated by an ignition source.

Although pulse detonation engines were developed for propulsion, it has been proposed to use pulse detonation engines for power generation. In an example power generation system, the detonation waves produced by the pulse detonation engine are used to displace a magnetic element of a linear power generator (LPG) relative to a stationary generator coil of the linear power generator to produce electrical energy that can be used to power a variety of devices and equipment or to supply an electric power grid.

While such power generation systems are viable, they are relatively inefficient in part because much of the energy of the detonation waves is in the form of heat (enthalpy) and not kinetic energy that is needed to drive the linear power generator. It would therefore be desirable to have a more efficient power generation system that utilizes a combustion source such as a pulse detonation engine.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a more efficient power generation system that utilizes a combustion source such as a pulse detonation engine (PDE). Disclosed herein are example embodiments of such power generation systems. In some embodiments, a power generation system includes a nozzle that is positioned between a combustion chamber of the pulse detonation engine and a drive piston of a linear power generator (LPG). During use of the system, the nozzle expands the combustion gases expelled from the combustion chamber, thereby converting much of the enthalpy into kinetic energy. This conversion results in greater force being imparted to the drive piston of the linear power generator by the detonation wave and, therefore, greater thermodynamic efficiency of the system. The system can further include passive exhaust ports that are used to expel exhaust from the system between combustions. In further embodiments, the system uses a non-combustible working fluid, such as a relatively dense gas or a liquid, to further increase the force that is imparted to the drive piston. In still further embodiments, the system includes an elongated working chamber between the nozzle and the drive piston that increases the overpressure time of the detonation wave.

In the following disclosure, various specific embodiments are described. It is to be understood that those embodiments are example implementations of the disclosed inventions and that alternative embodiments are possible. All such embodiments are intended to fall within the scope of this disclosure.

Pulse detonation engines typically have a constant cross-sectional area so that the detonation waves generated by combustion within the combustion chamber of the pulse detonation engine are stable. However, a constant area does not result in high efficiency when the pulse detonation engine is used in a power generation system that includes a linear power generator. It has been determined that greater efficiency can be attained by placing a nozzle between the combustion chamber of the pulse detonation engine and the drive piston of the linear power generator. Described below are examples of power generation systems that use nozzles in this manner.

Figure 1:
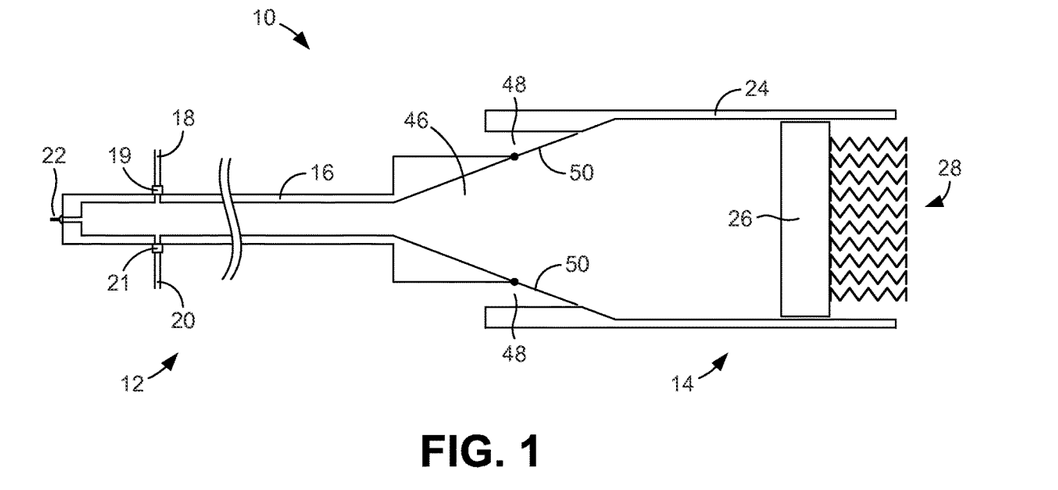
FIG. 1 is a schematic drawing of a first embodiment of a power generation system that uses a pulse detonation engine.

FIG. 1 illustrates a first embodiment of a power generation system 10. As shown in the figure, the system 10 generally includes a pulse detonation engine 12 and a linear power generator 14. The pulse detonation engine 12 comprises a combustion chamber 16, which can be an elongated cylindrical tube having metal walls. Fuel and oxidizer can be supplied to the combustion chamber 16 through a fuel inlet 18 and an oxidizer inlet 20, respectively.

The oxidizer can comprise a gas that includes oxygen, such as air. The fuel can comprise substantially any combustible gas or liquid. Example fuels include hydrogen gas, natural gas, propane, vaporized kerosene, and gasoline. In some embodiments, the fuel can comprise a low-grade fuel, such as flare and biogas fuels, which contain considerable amounts of nitrogen or methane. For detonative combustion, the presence of nitrogen and/or methane greatly increases the minimum size of a power generation system due to stability constraints of the detonation wave. However, adding small amounts of fuels like hydrogen gas to methane-air mixtures drastically reduces the cell width of a detonation wave and makes scaling to smaller, mobile power generation units feasible. For gas mixtures with a large mole fraction of methane, several technologies can be used to reduce the power generation system size. In some embodiments, a pressure swing adsorption system can be used to introduce more oxygen into the combustion chamber 16. In other embodiments, a reformer can be used to turn only a fraction of the methane molecules into hydrogen. Only a small amount of oxygen or hydrogen gas must be produced from such processes to scale down the size of the power generation system 10.

Irrespective of the fuels and oxidizers that are used, the volume of fuel and oxidizer delivered to the combustion chamber 16 and the timing of this delivery can, in some embodiments, be controlled by valves 19 and 21 associated with the fuel and oxidizer inlets 18 and 20, respectively. As is shown in FIG. 1, the combustion chamber 16 further includes an ignition source 22 that is used to ignite the mixture of fuel and oxidizer within the combustion chamber.

The combustion chamber 16 is connected to a working chamber 24 that houses a drive piston 26 of the linear power generator 14. In some embodiments, the working chamber 24 comprises a further elongated cylindrical tube having metal walls. In such embodiments, the drive piston 26 can be a cylindrical metal piston. As shown in FIG. 1, the drive piston 26 is connected to springs 28. In the illustrated embodiment, the springs 28 are positioned on the side of the piston 26 that faces away from the combustion chamber 16 such that the springs compress when the piston moves away from the combustion chamber in response to the impact of a detonation wave.

Figure 2:
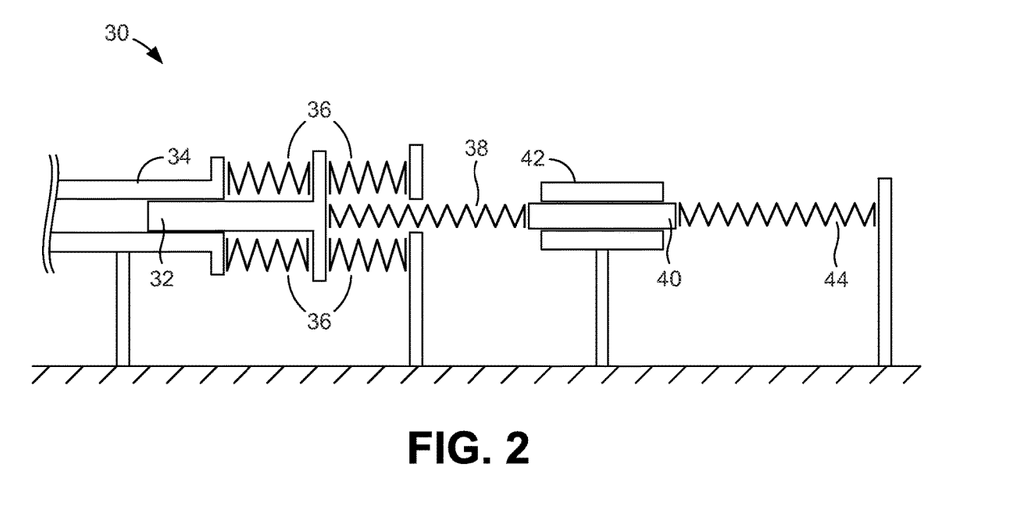
FIG. 2 is a schematic drawing of an embodiment of a linear power generator that can be used in the power generation system of FIG. 1.

FIG. 2 shows an example linear power generator 30 that can be used in the system 10 of FIG. 1. As shown in FIG. 2, the linear power generator 30 comprises a drive piston 32 that is positioned within a working chamber 34 in similar manner to the arrangement described above. Multiple springs 36 are connected to the piston 32 that oppose its linear displacement and act to return it to its initial resting position. In addition, a further spring 38 is connected to the piston 32 that is further connected to a magnetic member 40 that can slide back and forth relative to a generator coil 42 to generate electricity. As is further shown in FIG. 2, an additional spring 44 can be connected to the magnetic member 40 to limit its linear displacement. Although only a single magnetic member 40 and a single generator coil 42 are shown in FIG. 2, it is noted that the drive piston 32 could drive multiple members that are associated with multiple coils.

With reference back to FIG. 1, the power generation system 10 further comprises a nozzle 46 that is positioned between the combustion chamber 16 and the working chamber 24. In the illustrated embodiment, the nozzle 46 is integrally formed with both chambers 16, 24 so as to form a contiguous pulse detonation engine-linear power generator (PDE-LPG) component. The nozzle 46 expands the exhaust gases expelled by the combustion chamber 16 to convert the heat of the detonation waves into kinetic energy. The kinetic energy of the detonation waves are then converted into electricity as they strike the drive piston 26. The nozzle 46 has a geometry that maximizes the conversion of heat into kinetic energy while ensuring that the wave front remains stable. In some embodiments, the nozzle 46 comprises a divergent nozzle having straight walls. The angle of divergence can be set such that the detonation wave will not experience a large degree of flow separation as it expands. This ensures greater wave stability. The angle of divergence and the area ratios of the nozzle 46 can depend upon the mixture that is detonated in the combustion chamber 16.

As is further shown in FIG. 1, the power generation system 10 can also include one or more exhaust ports 48 that open and close during operation of passive exhaust flaps 50. In some embodiments, the exhaust flaps 50 are integrated into the nozzle 46 and are biased toward an open orientation (see FIGS. 3B and 3C) by a biasing element, such as a spring or valve device (not shown). The exhaust flaps 50 remain closed (as shown in FIG. 1) as a detonation wave passes over the flaps. However, once the wave passes by and pressure within the working chamber 24 in the vicinity of the flaps 50 subsides, the flaps can open under the force provided by the biasing elements to enable the exhaust gases to exit the working chamber 24.

Figure 3A:
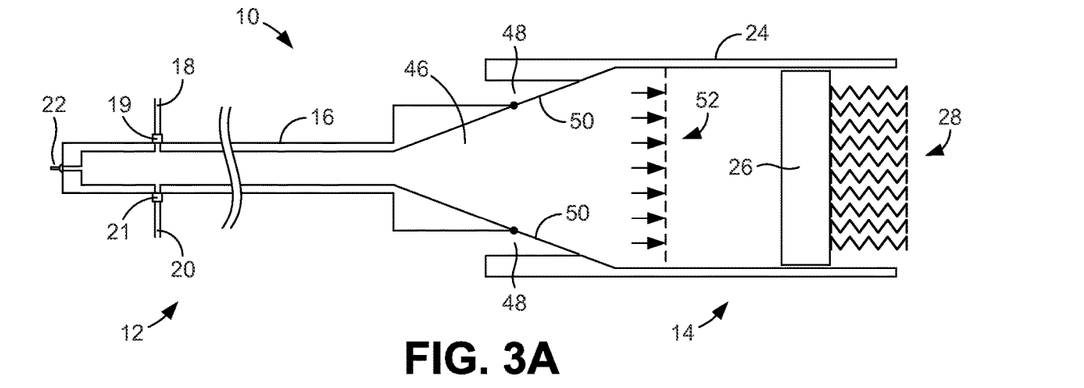
FIGS. 3A-3C are sequential views of the system of FIG. 1 that illustrate different stages of operation of the system.
Figure 3B:
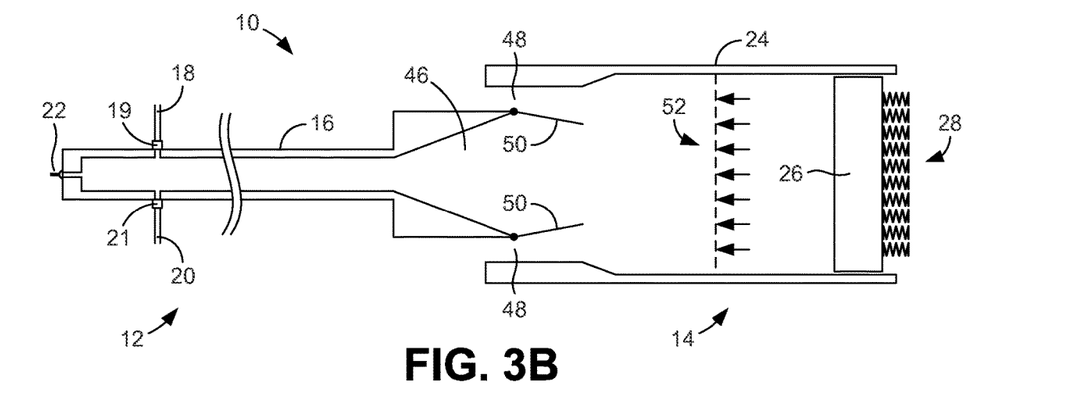
Figure 3C:
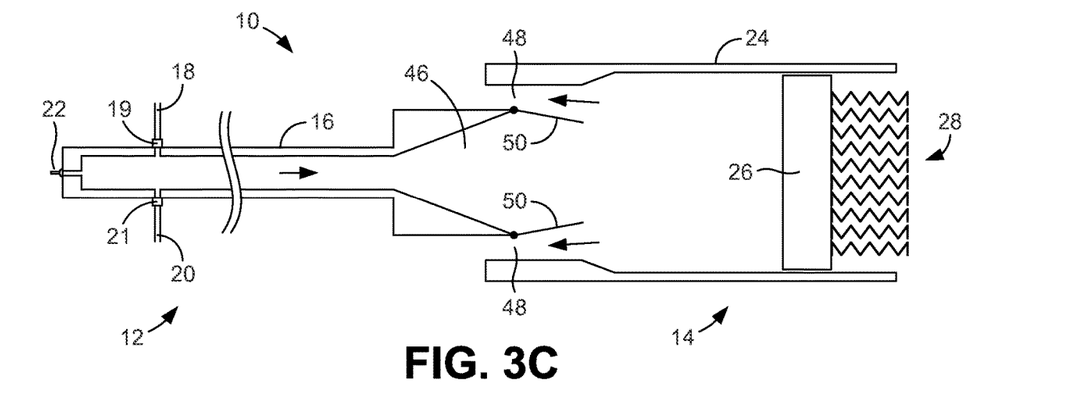

FIGS. 3A-3C illustrate an example of operation of the power generation system 10 and its exhaust flaps 50. Beginning with FIG. 3A, a detonation wave 52 is produced by combustion within the combustion chamber 16 is shown traveling down the working chamber 24 toward the drive piston 26. Because of the pressure associated with this wave 52, the exhaust flaps 50 remain closed. In FIG. 3B, the detonation wave 52 has struck the drive piston 26, causing the springs 28 to compress and the piston to move away from the combustion chamber 16. As shown in FIG. 3B, the detonation wave 52 has reflected off of the piston 26 and is moving back toward the detonation chamber 16. Because the pressure in the vicinity of the exhaust flaps 50 has been reduced, the flaps have opened under the force of their biasing elements. Accordingly, combustion gases can escape the working channel 24 through the exhaust ports 48 in the manner illustrated in FIG. 3C. The expulsion of these gases through the ports 48 can be aided by the backward propagation of the detonation wave 52 and the refilling of the combustion chamber 16 with fresh fuel and oxidizer. Although exhaust flaps 50 have been shown and described, it is noted that other passive exhaust elements can be used. For example, a sliding sleeve connected to the drive piston 26 can be used to open the exhaust ports 48 when the piston is displaced.

In some embodiments, the length of the working chamber can be optimized to increase the overpressure time of the detonation wave, i.e., the time during which the detonation wave affects the drive piston. The overpressure time of the detonation wave should be coupled with the natural frequency of the linear power generator. This interaction can be characterized using a mass-spring system and an overpressure duration $T_d$ of the detonation wave. In general, it is desirable to increase the overpressure time to the maximum extent possible for a fixed mass of fuel combusted. Due to the physical characteristics of a detonation wave propagating in a tube, the overpressure time is a function of the tube length. However, simply increasing the length of the tube to increase $T_d$ will not improve the efficiency of the system because high length-to-diameter tube ratios result in high frictional losses that significantly reduce the impulse generated by the detonation wave.

Figure 4:
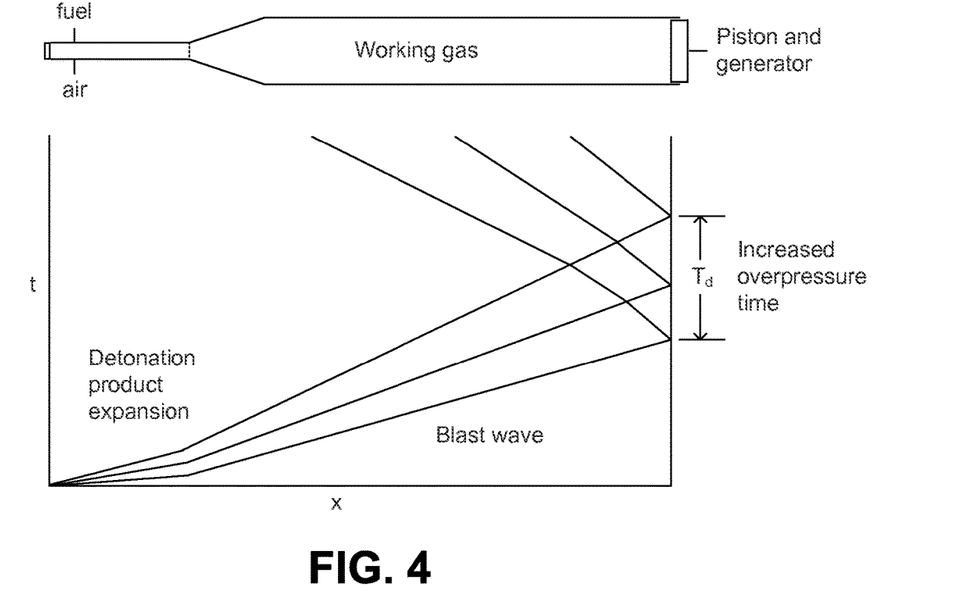
FIG. 4 is a graph that illustrates increased overpressure time achieved by using a relatively long working gas chamber.

As shown in FIG. 4, a long working chamber (tube) containing a non-combustible working gas can be used to raise the overpressure time. The combustion chamber length, working chamber length, and nozzle area ratio can be optimized to achieve maximum efficiency. In addition, the percentage of the combustion chamber that is filled with fresh reactants prior to combustion can be varied to change the degree of expansion and efficiency of the system.

Figure 5:
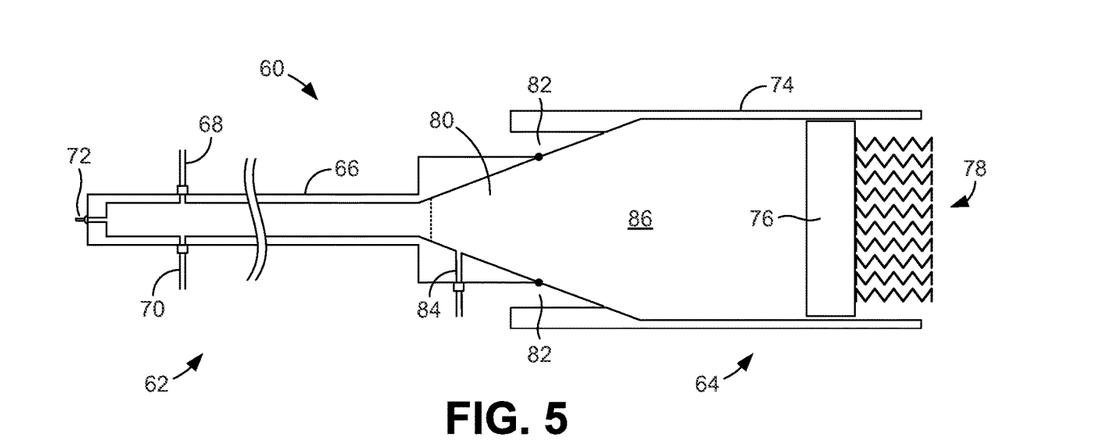
FIG. 5 is a schematic drawing of a second embodiment of a power generation system that uses a pulse detonation engine.

FIG. 5 illustrates an embodiment of a power generation system 60 that uses a working gas. The system 60 is similar in many ways to the system 10 described above. Accordingly, the system 60 comprises a pulse detonation engine 62 and a linear power generator 64. The pulse detonation engine 62 comprises a combustion chamber 66 that includes a fuel inlet 68, an oxidizer inlet 70, and an ignition source 72. The combustion chamber 66 is connected to a working chamber 74 that houses a drive piston 76 that is connected to springs 78. Positioned between the combustion chamber 66 and the working chamber 74 is a nozzle 80 and exhaust ports 82. Unlike the system 10, however, the system 60 comprises a working gas inlet 84 that can be used to deliver a working gas 86 to the working chamber. In some embodiments, the working gas 86 is a non-combustible gas that has a higher density and molecular mass than the combustion gases of the detonation wave. Using such a working gas results in a higher specific impulse being imparted to the drive piston 76 and increases the overall efficiency of the system 60. By way of example, the working gas 86 can comprise carbon dioxide or air. In some embodiments, gas-particle mixtures can be used to further increase the density of the working gas 86. In other embodiments, a valve, such as an electromechanical or rotary gate valve, can be used to separate the fuel/oxidizer mixture and the working gas 86 before the detonation wave is initiated. In still other embodiments, the working gas 86 can be combustion gas that has been collected from the exhaust ports and cooled through a heat exchanger to increase its density.

Figure 6A:
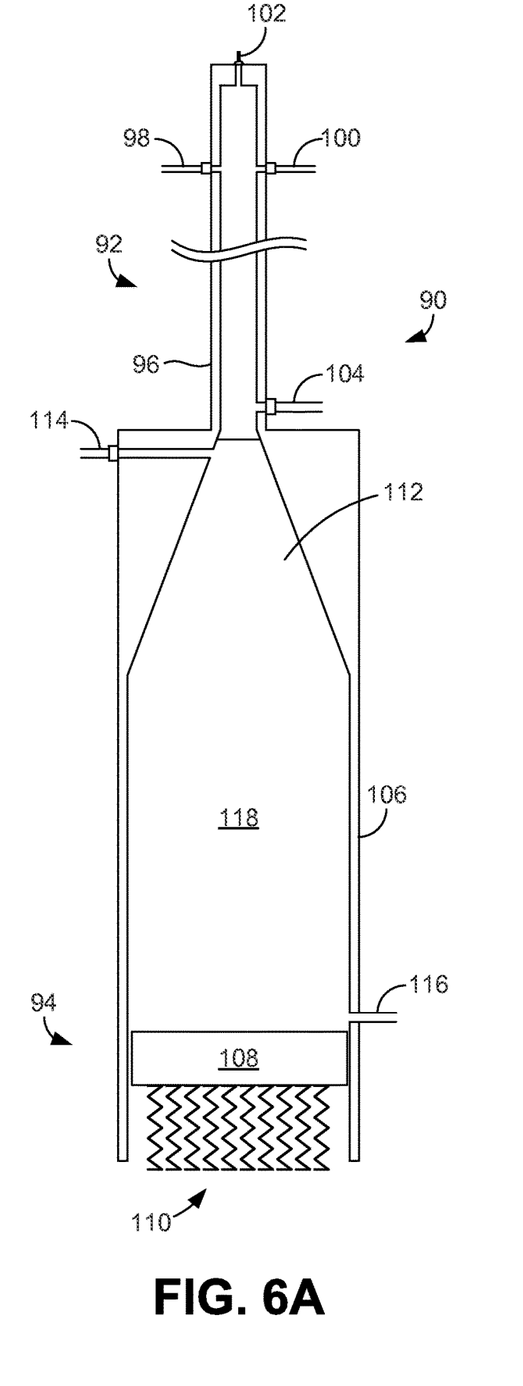
FIGS. 6A and 6B are schematic drawings of a third embodiment of a power generation system that uses a pulse detonation engine, the figures showing different stages of operation of the system.
Figure 6B:
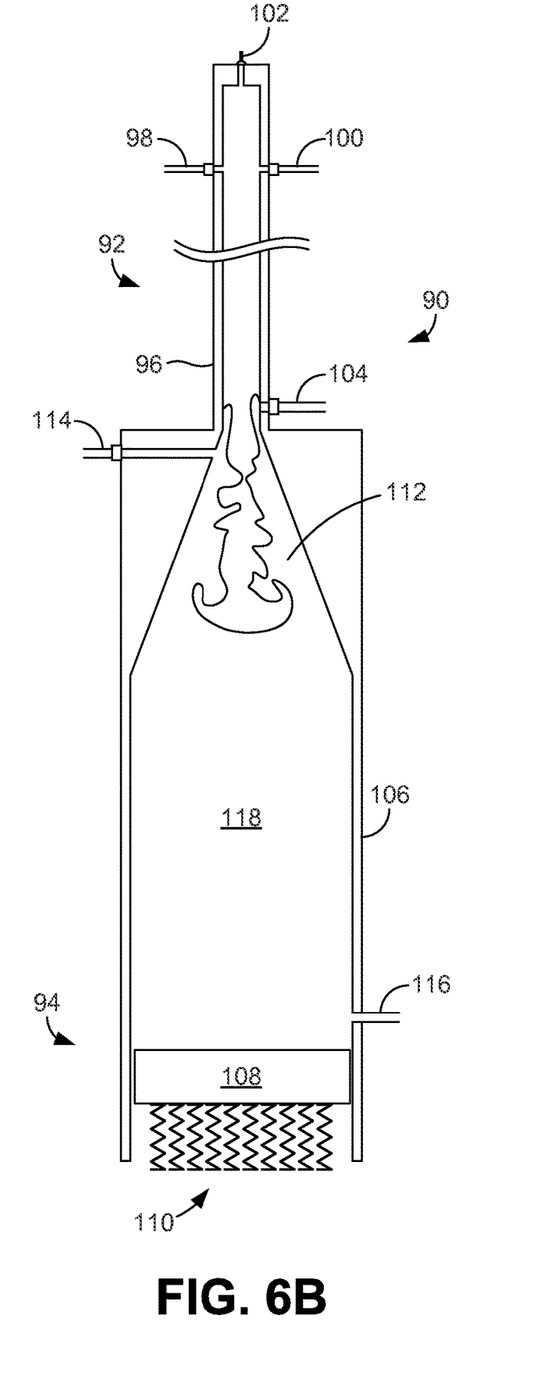

In some cases, a working liquid can be used instead of a working gas. FIGS. 6A and 6B illustrate an embodiment of a power generation system 90 that utilizes a working liquid. The system 90 has a vertical configuration in which a pulse detonation engine 92 is positioned above a linear power generator 94. The pulse detonation engine 92 comprises a combustion chamber 96 that includes a fuel inlet 98, an oxidizer inlet 100, an ignition source 102, and an exhaust port 104. The combustion chamber 96 is connected to a working chamber 106 that houses a drive piston 108 that is supported by springs 110. Positioned between the combustion chamber 96 and the working chamber 106 is a nozzle 112. The system 90 further comprises a working liquid inlet 114 positioned near the entrance of the nozzle 112 and a working fluid outlet 116 positioned near the drive piston 108. The working liquid inlet 114 can be used to fill the working chamber 106 and nozzle 112 with a working liquid 118, such as water. Because the liquid is incompressible, interaction with the detonation wave creates a large rise in pressure that acts against the piston 108 to create electricity. The use of a liquid also enables sequestration of carbon dioxide and other products from the combustion process. Absorption into a liquid is one method to sequester carbon dioxide. Absorption is made possible by using a liquid, such as ammonia. The high pressure of the detonation wave striking the cool liquid is ideal for absorption. The passage of the wave through the gas-liquid interface also causes a Richtmyer-Meshkov instability to form, as depicted in FIG. 6B. This instability is favorable for the system 90 because it enhances mixing and absorption. The working liquid 118 can be removed on a periodic basis through the working liquid outlet 116.

Figure 7:
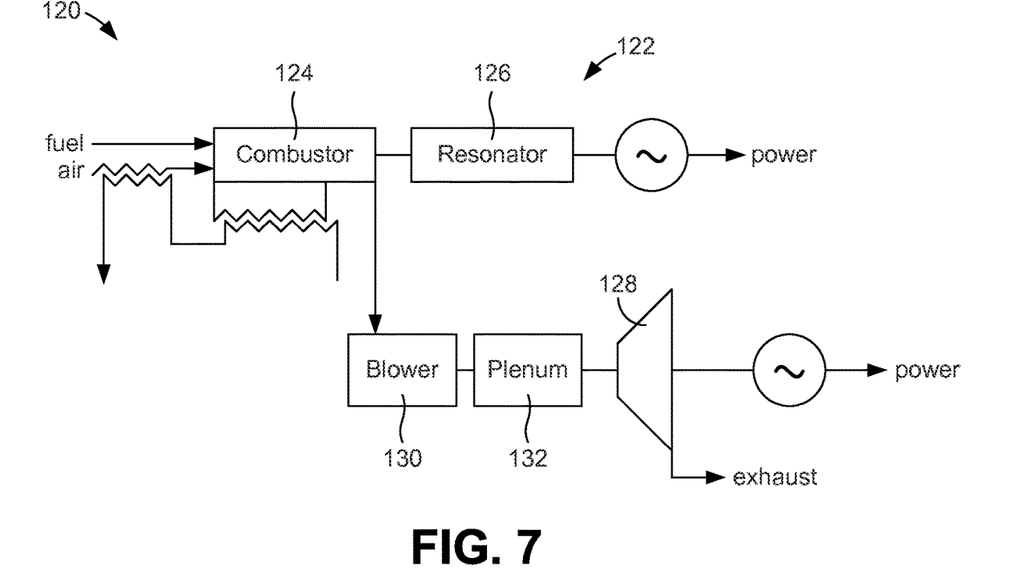
FIG. 7 is a schematic drawing showing a power generation system that uses a pulse detonation engine and that includes a power turbine.
Figure 8:
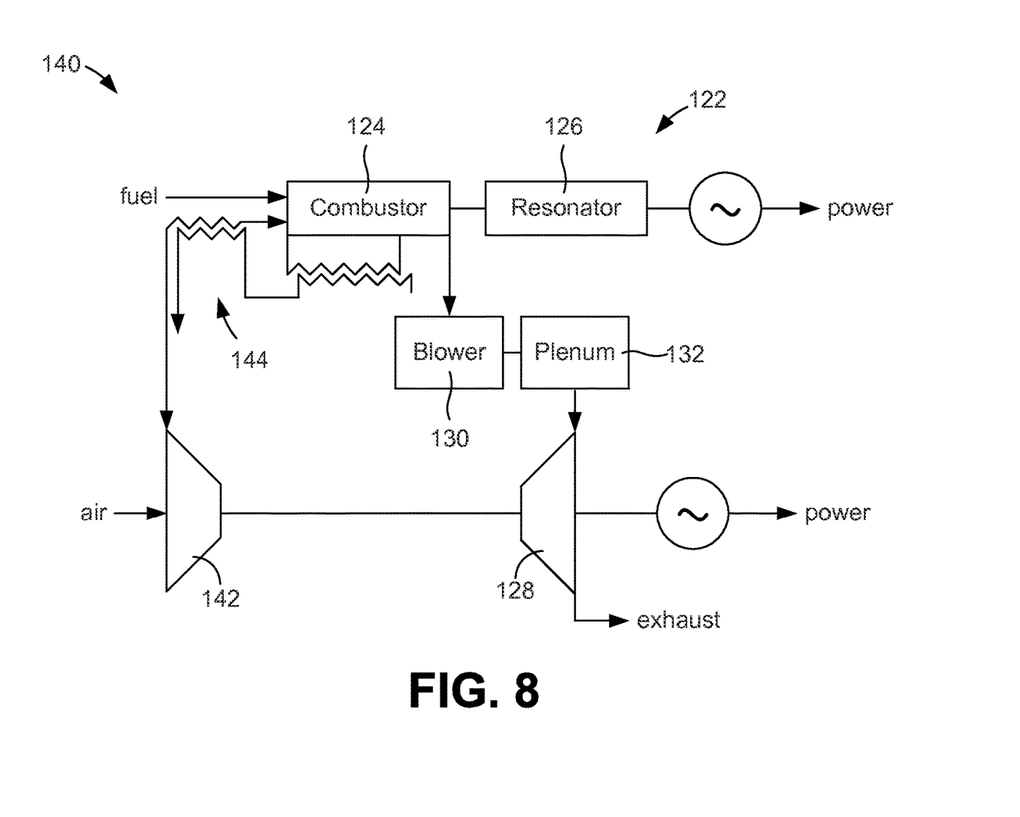
FIG. 8 is a schematic drawing showing a power generation system that uses a pulse detonation engine and that includes a power turbine and an air compressor.
Figure 9:
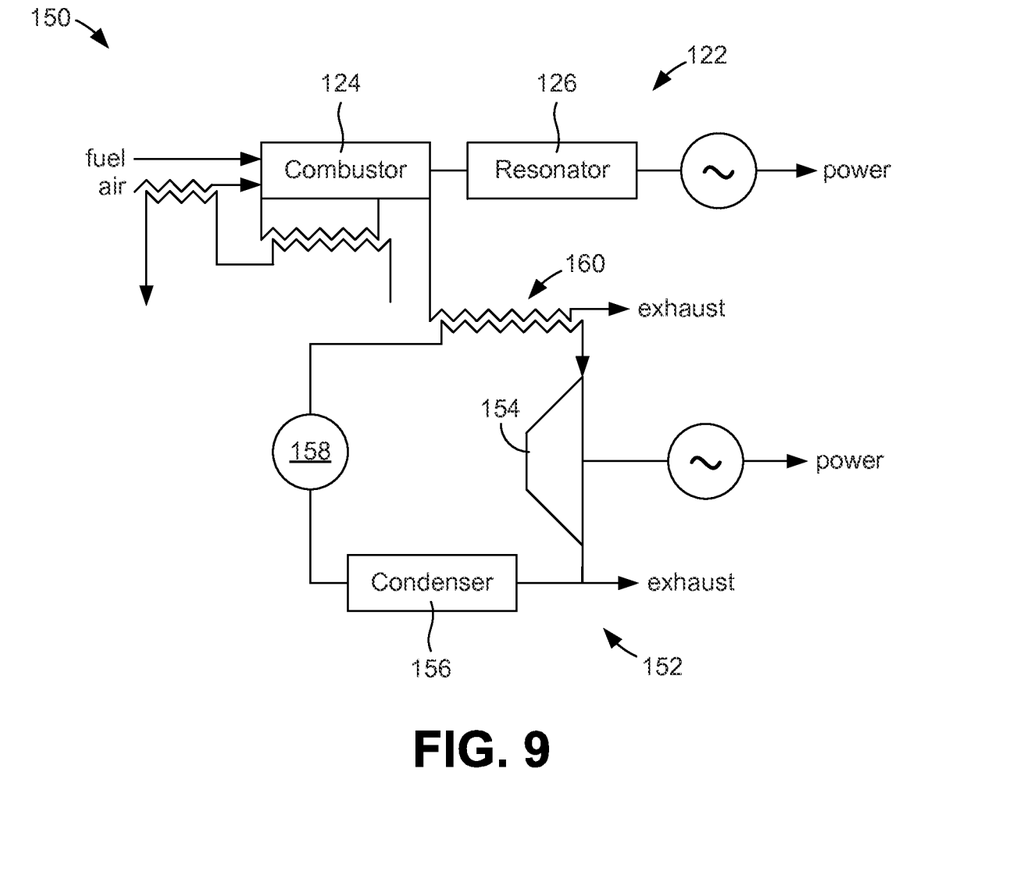
FIG. 9 is a schematic drawing showing a power generation system that uses a pulse detonation engine and that includes a steam cycle.

Power generation systems of the types described above can be combined with other thermodynamic systems to produce hybrid power generation systems. FIGS. 7-9 illustrate examples of such systems. Beginning with FIG. 7, a hybrid power generation system 120 uses high-temperature exhaust gas from a combustion-based power generation system 122 including a combustor 124 and a resonator 126 to drive a turbine 128 to produce secondary electricity. As shown in FIG. 7, the exhaust gas can be driven and pressurized by a blower 130 that first supplies the gas to a plenum 132 upstream of the turbine 128 that maintains a constant pressure.

FIG. 8 shows a hybrid power generation system 140 that is similar to the system 120 of FIG. 7. However, the system 140 further includes a compressor 142 coupled to the turbine 128 that increases the pressure of the oxidizer (e.g., air) that is provided to the combustion-based power generation system 122 to increase the total efficiency of the system. The air can be cooled prior to entering the combustion-based power generation system 122 using one or more heat exchangers 144.

In cases in which the working pressure of the exhaust gas is not high enough to be compatible with a turbine, the exhaust gas can be used to drive a steam cycle. Such an embodiment is shown in FIG. 9. As shown in this figure, a hybrid power generation system 150 includes a combustion-based power generation system 122 and a steam cycle 152 that uses the hot exhaust gas from the combustion-based power generation system to generate steam that can drive a turbine 154. Also included in the steam cycle 152 are a condenser 156, a pump 158, and a boiler 160.

The invention claimed is:

1. A power generation system comprising:
    a pulse detonation engine configured to detonate fuel and oxidizer mixtures, the pulse detonation engine including a combustion chamber having a fuel inlet, an oxidizer inlet, and an ignition source;
    a linear power generator configured to generate power responsive to detonations that occur within the combustion chamber of the pulse detonation engine, the linear power generator including a working chamber and a drive piston disposed within the working chamber, the drive piston being configured to linearly travel along a length of the working chamber;
    a divergent nozzle formed by an inner wall, wherein the divergent nozzle links the combustion chamber of the pulse detonation engine with the working chamber of the linear power generator and expands exhaust gas expelled from the combustion chamber, wherein the divergent nozzle gradually increases in cross-sectional area to increase the thermodynamic efficiency of the system; and
    a passive exhaust flap having a pivot point about which the passive exhaust flap can pivot, the passive exhaust flap being configured to automatically open and close during operation of the power generation system to enable exhaust gases to exit the working chamber of the linear power generator, wherein the passive exhaust flap aligns with the inner wall of the divergent nozzle when closed.

2. The system of claim 1, wherein the linear power generator further includes a spring that opposes displacement of the drive piston.

3. The system of claim 1, wherein the exhaust flap is biased toward an open position.

4. The system of claim 1, wherein the working chamber contains a non-combustible working fluid.

5. The system of claim 4, wherein the working fluid is a relatively dense non-combustible gas.

6. The system of claim 4, further comprising a working fluid inlet that is used to fill the working chamber with working fluid.

7. The system of claim 1, wherein the working chamber is elongated so as to increase overpressure time.

8. The system of claim 1, wherein the system is a hybrid system that includes a turbine that is driven by exhaust gas from the pulse detonation engine.

9. The system of claim 8, wherein the system further includes a compressor connected to the turbine that increases the pressure of the oxidizer before it enters the combustion chamber.

10. The system of claim 1, wherein the system is a hybrid system that includes a steam cycle that is driven by exhaust gas from the pulse detonation engine.

\* \* \* \* \*